United States Patent [19]

Kitani

[11] Patent Number: 5,041,750

[45] Date of Patent: Aug. 20, 1991

[54] VIBRATION WAVE DRIVEN APPARATUS

[75] Inventor: Koji Kitani, Kawasaki, Japan

[73] Assignee: Canon Kabushiki Kaisha, Tokyo, Japan

[21] Appl. No.: 627,302

[22] Filed: Dec. 14, 1990

[30] Foreign Application Priority Data

Dec. 15, 1989 [JP] Japan ............................ 1-325425

[51] Int. Cl.⁵ ............................................ H01L 41/08
[52] U.S. Cl. .................................................. 310/323
[58] Field of Search .............................. 310/323, 328

[56] References Cited

U.S. PATENT DOCUMENTS 4,580,073 4/1986 Okumura et al. .................. 310/323

FOREIGN PATENT DOCUMENTS

| 0136985 | 6/1988 | Japan | 310/323 |
| 0055082 | 3/1989 | Japan | 310/323 |
| 0107678 | 4/1989 | Japan | 310/323 |
| 0291674 | 11/1989 | Japan | 310/323 |
| 0070277 | 3/1990 | Japan | 310/323 |

Primary Examiner—Mark O. Budd
Attorney, Agent, or Firm—Fitzpatrick, Cella, Harper & Scinto

[57] ABSTRACT

In a vibration wave driven apparatus, a vibration member of a closed loop shape having at least one set of parallel straight portions is provided on one of the straight portions with a projection group in which in the driving frequency of the vibration member, the vibration mode is the 1st-order mode of the fixed end-free end vibration and on the other straight portion with a projection group in which the vibration mode is the 2nd-order mode of the fixed end-free end vibration, whereby forces in the same direction which are not couples are generated in the both straight portions to thereby enable an object to be rectilinearly driven in a plane formed by the straight portions, thus preventing the irregularity of feeding speed and any partial wear caused by one-sided contact and enabling the drive force to be increased.

13 Claims, 3 Drawing Sheets

VIBRATION WAVE DRIVEN APPARATUS

BACKGROUND OF THE INVENTION

1. Field of the Invention

This invention relates to a vibration wave driven apparatus in which a resilient member in which a travelling vibration wave is formed is of a closed loop shape having at least straight portions, for example, an elliptical shape.

2. Related Background Art

A vibration wave driven motor in which an AC voltage is applied to an electro-mechanical energy conversion element such as a piezo-electric element in a vibration member having the electro-mechanical energy conversion element secured to a ring-shaped metallic resilient member to thereby excite a travelling vibration wave in the resilient member and create elliptical movement of surface particles and thereby rotatively move a member which is in pressure contact with the resilient member has already been put into practically used. Also, in a vibration wave driven motor for rectilinear driving wherein a vibration is caused from one end of a straight beam-like resilient member and is absorbed by the other end of the resilient member to there create a travelling vibration wave for rectilinear driving or a vibration wave driven motor using a vibration member of a closed loop shape, there has been proposed a method of utilizing the tangential force of said ring-shaped vibration member or a method of bringing a contact member into contact with the straight portions of a resilient member having arcuate portions and straight portions to thereby create rectilinear movement.

Herein, a vibration member of a closed loop shape and a self-running type vibration wave driven motor using the same will be described with reference to the accompanying drawings.

FIG. 2 shows an example of a prior-art vibration member 1 having arcuate portions and straight portions and in which a piezo-electric element group 1b is joined to a resilient member 1a having equally spaced-apart grooves 1c.

FIGS. 4A and 4B show an example of a self-running type vibration wave driven motor using the above-described vibration member. The reference numeral 1 designates the vibration member, and the reference numeral 9 denotes a rail-like friction member which is in frictional contact with the vibration member 1. The friction member 9 is brought into pressure contact with the vibration member 1 by a pressing spring 3 with a vibration insulating material 2 (for example, felt) interposed therebetween.

The reference numeral 6 designates a comb-tooth-like movement stopper of which the comb-tooth portion 6a is inserted in a slit in the vibration member 1 in that portion thereof which is not in contact with the friction member 9 on a base stand 8 and supports the vibration member 1 through felt 5 disposed on the bottom of the slit.

The vibration member 1 is supported by a supporting table 4 through the movement stopper 6, the pressing spring 3, etc., and the supporting table 4 in turn is supported by a restraining member 7 for restraining displacement in any other direction than a predetermined direction of movement.

In the above-described example of the prior art, however, only a part of the vibration of the vibration member 1 is used for driving and therefore, efficiency is low and also, the contact between the vibration member and a driven member moved relative thereto is hardly uniform, and this has led to the disadvantage that the drive force is increased and decreased or localized wear occurs, or the necessity of making the surfaces of contact between the vibration member 1 and the driven member parallel and effecting uniform pressing has resulted in disadvantages such as an increased number of parts and an increased adjustment time.

That is, the direction of travel of the travelling wave formed on the resilient member 1 is opposite in the straight portions opposed to each other and therefore, the two straight portions could not be used for rectilinear driving. Thus, only one of the straight portions of the vibration member can be used for driving, and this has led to the above-noted disadvantages.

SUMMARY OF THE INVENTION

It is an object of the present invention to eliminate the above-noted disadvantages and to provide a vibration wave driven motor in which the straight portions of a vibration member of a closed loop shape can be used at a time for rectilinear driving.

It is another object of the present invention to provide a vibration wave driven apparatus which uses a vibration member of a closed loop shape and which is of good efficiency.

It is still another object of the present invention to provide a vibration wave driven apparatus which is suited, for example, for driving of the printing head of a printer.

Other objects of the present invention will become apparent from the following detailed description of the invention.

In an embodiment of the present invention, a vibration member of a closed loop shape having at least one set of parallel straight portions is provided on one of the straight portions with a projection group in which in the driving frequency of said vibration member, the vibration mode is the 1st-order mode of the fixed end-free end vibration and on the other straight portion with a projection group in which the vibration mode is the 2nd-order mode of the fixed end-free end vibration, whereby forces in the same direction which are not couples are generated in the both straight portions to thereby enable an object to be rectilinearly driven in a plane formed by the straight portions, thus preventing the irregularity of feeding speed and any partial abrasion caused by one-sided contact and enabling the drive force to be increased.

DETAILED DESCRIPTION OF THE PREFERRED EMBODIMENTS

Figure 1A:
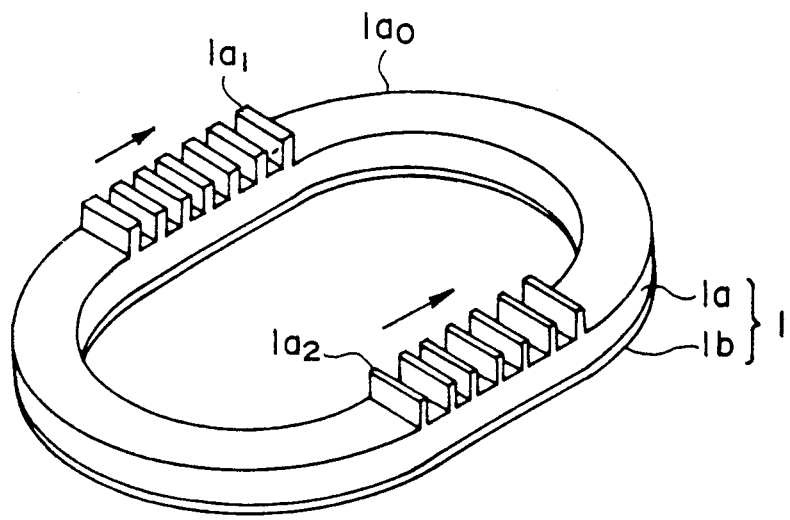
FIG. 1A is a perspective view of a vibration member showing an embodiment of a vibration wave driven motor according to the present invention.

The present invention will hereinafter be described in detail with respect to an embodiment thereof shown in the drawings.

FIG. 1A is a perspective view of a vibration member 1 showing an embodiment of the vibration wave driven motor according to the present invention.

In FIG. 1A, the reference numeral 1 designates a vibration member formed, for example, of stainless steel or phosphor bronze and having on the underside of a resilient member 1a having a pair of arcuate portions and a pair of straight portions two groups of driving piezoelectric elements polarized into a plurality, and having a piezo-electric element group 1b of the same cross-sectional shape as the resilient member 1a secured to said underside by a heat-resisting epoxy resin adhesive. The resilient member 1a comprises a first projection group $1a_1$ comprising a plurality of projections formed on the upper surface of one of the straight portions, and a second projection group $1a_2$ comprising a plurality of projections formed on the upper surface of the other straight portion, the projections of the second group $1a_2$ being smaller in the circumferential thickness than the projections of the first group $1a_1$.

If the resonance frequency of the driving mode of the vibration member 1 is represented by fr and the resonance frequency of the primary mode of the fixed end-free end vibration of the first projection group $1a_1$ is represented by $f_{11}$ and the resonance frequency of the primary mode of the fixed end-free end vibration of the second projection group $1a_2$ is represented by $f_{21}$ and the resonance frequency of the secondary mode is represented by $f_{22}$, the magnitude relations therebetween are as follows:

$$fr < f_{11} \quad \text{Condition } \textcircled{1}$$

$$f_{21} < fr < f_{22} \quad \text{Condition } \textcircled{2}$$

Figures 1B, 1C, 1D:
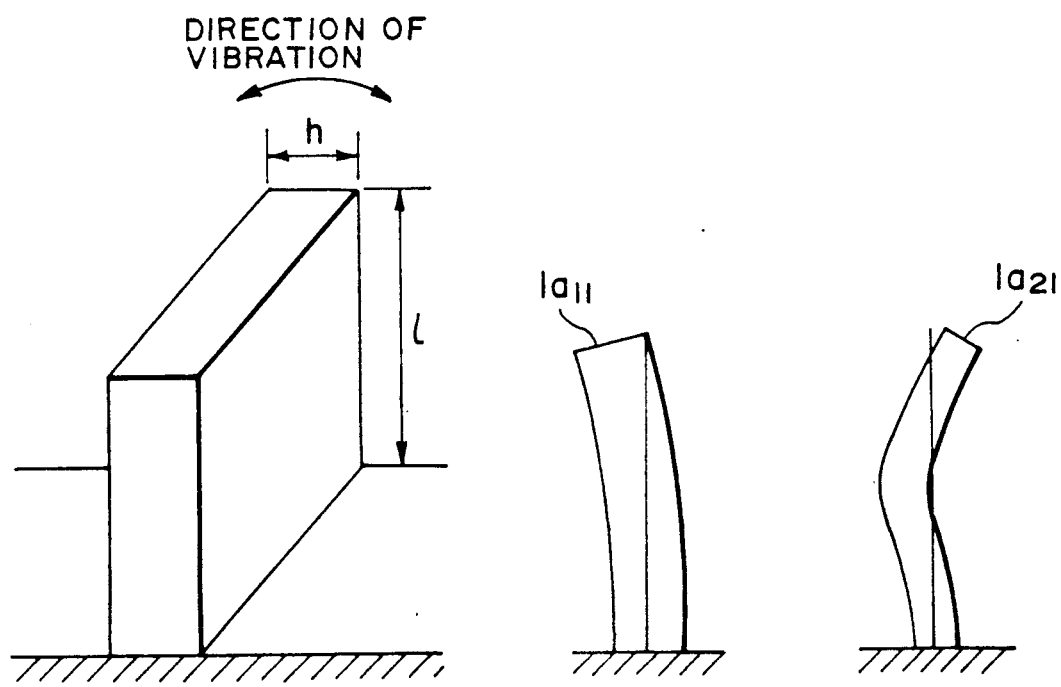
FIG. 1B is a perspective view showing a projection of the vibration member.
FIGS. 1C and 1D show the states of vibration in the 1st- and 2nd-order modes, respectively, of the fixed end-free end vibration.
Figure 2:
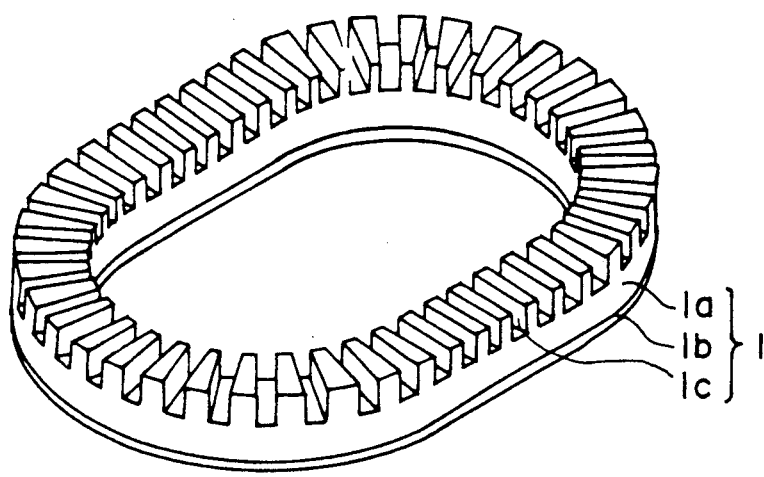
FIG. 2 is a perspective view of a vibration member according to the prior art.

Here, the resonance frequency of the fixed end-free end vibration of the projection as shown in FIG. 1B in the direction of arrow can be roughly found as follows:

In the 1st-order mode, $$f_1 = \frac{1}{2\pi}\left[\frac{1.875}{l}\right]^2 \sqrt{\frac{E}{12\rho}} h$$

In the 2nd-order mode $$f_2 = \frac{1}{2\pi}\left[\frac{4.694}{l}\right]^2 \sqrt{\frac{E}{12\rho}} h$$

(E: Young's modulus, $\rho$: density)

When such a vibration member 1 is resonated by applying thereto an AC voltage in the vicinity of the resonance frequency fr to thereby excite a travelling vibration wave, each particle of the vibration member 1 creates elliptical movement and the first projection group $1a_1$ vibrates in the 1st-order mode as shown in FIG. 1C by the aforementioned condition $\textcircled{1}$, and the tip end thereof effects elliptical movement substantially in the same phase as the elliptical movement of the boundary between the base portion $1a_0$ and the first projection group $1a_1$, while the second projection group $1a_2$ vibrates in the 2nd-order mode as shown in FIG. 1D and the particles of the tip end $1a_{21}$ thereof create elliptical movement which is about 180° out of phase with respect to the elliptical movement of the boundary between the base portion $1a_0$ and the second projection group $1a_2$. Thus, the tip ends $1a_{11}$ and $1a_{21}$ of the both projection groups are moving in the same direction (see the arrow in FIG. 1A) at the maximum point of elliptical movement.

A bubble jet printer which uses as the drive source of a printing head a self-running type vibration wave driven motor using the vibration member of the present invention will hereinafter be described with respect to an embodiment thereof shown in the drawings.

The bubble jet type printer is a printer as disclosed, for example, in U.S. Pat. No. 4,723,129 or U.S. Pat. No. 4,740,796, and briefly describing it, it generically to a printer of the type in which at least one driving signal corresponding to recording information and providing a rapid temperature rise exceeding nucleon boiling is applied to an electro-thermal conversion member disposed correspondingly to a sheet or a liquid path in which liquid (ink) is retained, to thereby generate heat energy in the electro-thermal conversion member and cause film boiling to be created on the heat-acting surface of a recording heat with a result that a bubble in the liquid (ink) is formed correspondingly to said driving signal and by the growth and contraction of the bubble, the liquid (ink) is discharged through a discharge opening to thereby form at least one droplet, which is blown against the sheet to thereby form a character.

Figure 3:
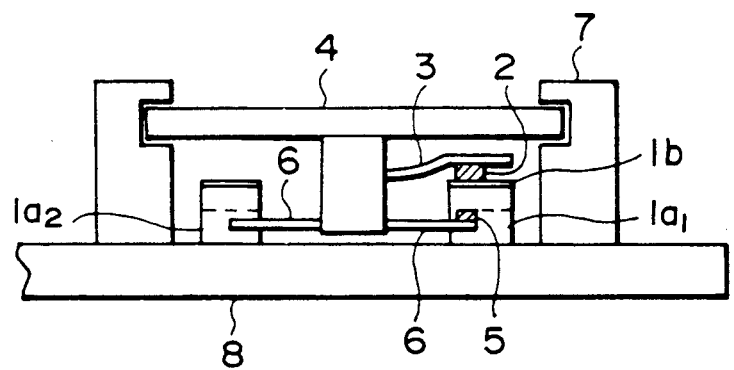
FIG. 3 is a cross-sectional view of a self-running type vibration wave driven motor using the vibration member of the present invention.

In FIG. 3, the reference character 1a designates a vibration member having the first projection group $1a_1$ and the second projection group $1a_2$ as shown in FIG. 1A, and a piezo-electric element 1b as an electro-mechanical energy conversion element is joined to the vibration member. The vibration member 1 has its comb-tooth-like movement stopper 6 inserted in the groove portion (see FIG. 1A) in the first projection group $1a_1$ or the second projection group $1a_2$, and is supported relative to a supporting table 4 on which the printing head (not shown) of the printer is provided, by the comb-tooth portion of the movement stopper 6 through felt 5 disposed on the bottom of the groove. The supporting table 4 is restrained by guide rails 7 for restraining it in the thrust direction and the right-to-left direction. Also, the surface of contact between the vibration member 1 and a base stand 8 secured to the base plate of the printer is treated for wear resistance or coated with a wear resisting material, and the vibration member 1 is pressed against the base stand 8 with a suitable pressure force by a leaf spring 3 with felt 2 interposed therebetween.

Description will now be made of the operation when the printer using this vibration wave driven motor as the drive source is driven.

When AC voltages having a certain frequency and having an electrical phase difference therebetween are applied to the piezo-electric elements of the piezo-electric element group 1b, a travelling vibration wave is generated in the vibration member 1 in a known manner. As previously described, the surface particles of the first projection group $1a_1$ and the second projection group $1a_2$ move in the same direction and therefore, by the frictional force between the first projection group $1a_1$ and the second projection group $1a_2$ and the base stand 8, the vibration member 1 is moved in a direction perpendicular to the plane of the drawing sheet of FIG. 3 with the supporting table 4, etc. Also, if the direction of the travelling vibration wave is reversed, the elliptical movement of the particles is also reversed and therefore, the vibration member is moved in the opposite direction. By the direction of the travelling vibration wave being suitably reversed in this manner, the vibration member can be reciprocally moved.

A sheet conveying system using the vibration member according to the present invention will now be described with reference to FIG. 5.

Figure 5:
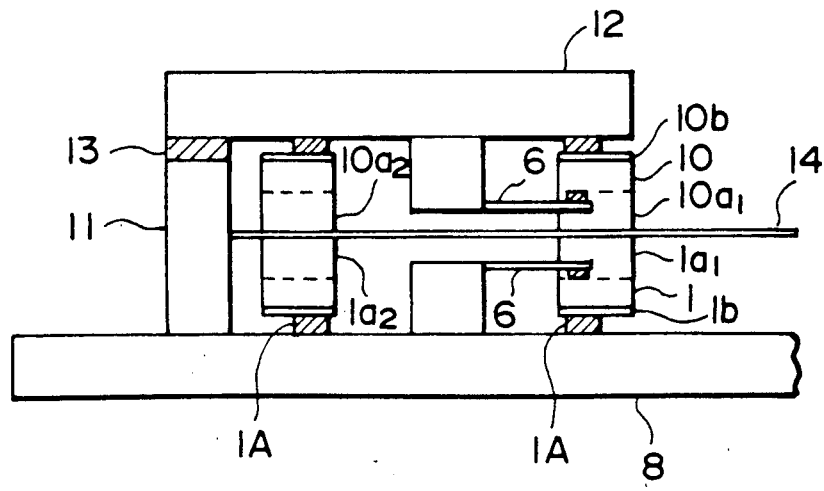
FIG. 5 is a cross-sectional view showing a sheet conveying system using the vibration member of the present invention.
Figure 4A:
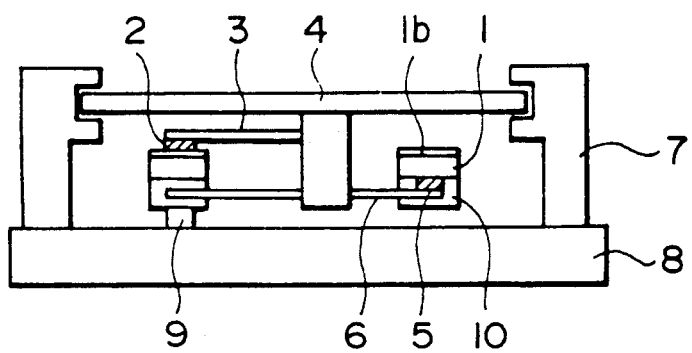
FIGS. 4A and 4B are a cross-sectional view and a plan view, respectively, of a self-running type vibration wave driven motor using the prior-art vibration member.
Figure 4B:
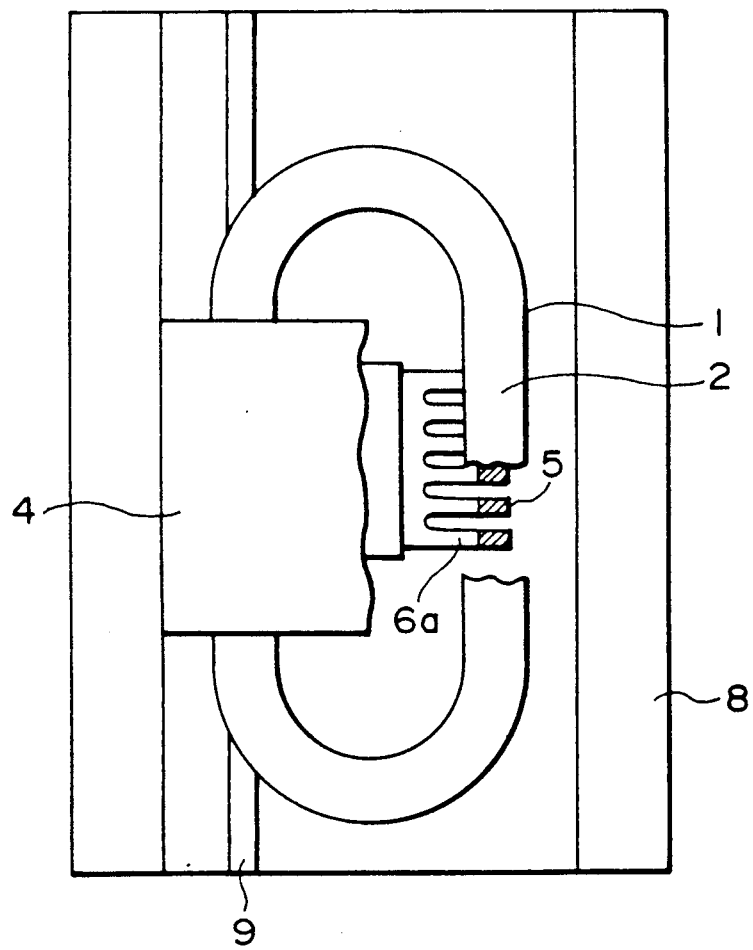

FIG. 5 shows an embodiment of the driving portion of an apparatus in which two vibration members each having two projection groups differing in the circumferential thickness thereof as shown in FIG. 1A are pressed in face-to-face relationship with each other and a sheet-like object such as paper nipped therebetween is conveyed.

The vibration member 1 is supported on the base stand 8 by the movement stopper 6 with felt interposed therebetween. A vibration member 10 opposed to the vibration member 1 is likewise supported on an upper lid 12 by the movement stopper 6 with felt 1A interposed therebetween.

The upper lid 12 and the base stand 8 are coupled together by an oblique movement preventing guide 11 and a springy member 13, and the vibration members 1 and 10 are pressed with a suitable pressure force. The first projection groups $1a_1$ and $10a_1$ of the vibration members 1 and 10, respectively, which satisfy the aforementioned condition ① are opposed to each other, and the second projection groups $1a_2$ and $10a_2$ of the vibration members 1 and 10, respectively, which satisfy the aforementioned condition ②, are opposed to each other.

When AC voltages of the same frequency are applied to piezo-electric elements $1b$ and $10b$ joined to the vibration members 1 and 10, respectively, so that travelling vibration waves may be generated in the same direction, and the time phases of the vibrations of the two vibration members are appropriately chosen and a sheet-like object 14 (for example, paper) is nipped between the two vibration members, the sheet-like object 14 is subjected to forces in the same direction from the first projection groups $1a_1$, $10a_1$ and the second projection group $1a_2$, $10a_2$ of the vibration members 1 and 10. The speeds of the particles in the surface portions of the first and second projection groups ($1a_1$ and $1a_2$, $10a_1$ and $10a_2$) of the respective vibration members are generally not equal to each other and therefore, the sheet-like object is dashed against the oblique movement preventing guide 11, whereby it can be rectilinearly driven.

As described above, for example, a projection group vibrating in the nth-order mode is provided on one of the parallel straight portions of the vibration member of the vibration wave driven motor and a projection group vibrating in the (n+1)th-order mode (n being integers exclusive of zero) is provided on the other straight portion, whereby it becomes possible to uniformize the drive forces of the two projection groups in the same direction, and as compared with a case where one of the straight portions is used, there are the following effects:

1. The use of the two parallel straight portions of the same vibration member prevents one-sided contact and makes pressing easy;
2. The prevention of one-sided contact reduces the irregularity of the drive force and the irregularity of the speed and also prevents localized wear; and
3. The contact by the two groups readily enables the drive force to be obtained and also provides a great holding force.

What is claimed is:

1. A vibration wave driven apparatus comprising:
   (a) a loop-shaped vibration member having first and second projection groups which are in contact with a driven member; and
   (b) an electro-mechanical energy conversion member for generating a travelling vibration wave in said vibration member in response to an applied electrical signal, said first projection group vibrating in the nth-order mode and said second projection group vibrating in the (n+1)th-order mode (n being integers exclusive of zero) when the conversion member causes the vibration wave in the vibration member.

2. A vibration wave driven apparatus according to claim 1, wherein said first projection group vibrates in the 1st-order mode and said second projection group vibrates in the 2nd-order mode.

3. A vibration wave driven apparatus according to claim 1, wherein said first and second projection groups are juxtaposed along a predetermined direction.

4. A vibration wave driven apparatus according to claim 2, wherein said first and second projection groups each have a plurality of rectangular parallelopiped projections provided across the direction of travel of said travelling vibration wave, and said projection groups are juxtaposed along a predetermined direction.

5. A vibration wave driven motor comprising:
   (a) a loop-shaped vibration member having first and second straight portions which are in contact with a driven member; and
   (b) an electro-mechanical energy conversion member for generating a vibration wave in said vibration member in response to an applied electrical signal, said first portion vibrating in the nth-order mode and said second portion vibrating in the (n+1)th-order mode (n being integers exclusive of zero) when the conversion member generates the vibration wave in the vibration member.

6. A vibration wave driven motor according to claim 5, wherein said first portion vibrates in the 1st-order mode and said second portion vibrates in the 2nd-order mode.

7. A vibration wave driven motor comprising:
   (a) a loop-shaped vibration member having first and second portions which are in contact with a driven member; and
   (b) an electro-mechanical energy conversion member for generating a vibration wave in said vibration member in response to an applied electrical signal, said first portion vibrating in the nth-order mode and said second portion vibrating in the (n+1)th-order mode (n being integers exclusive of zero) when the conversion member generates the vibration wave in the vibration member.

8. A vibration wave driven motor according to claim 7, wherein said first portion vibrates in the 1st-order mode and said second portion vibrates in the 2nd-order mode.

9. A vibration member for a vibration wave driven motor comprising:

a vibration member having first and second portions which are in contact with a driven member and for generating a vibration wave in response to an applied electrical signal, said first portion vibrating in the nth-order mode and said second portion vibrating in the (n+1)th-order mode (n being integers exclusive of zero) when the vibration wave is generated in the vibration member.

10. A vibration wave driven printer comprising:
(a) a loop-shaped vibration member having first and second straight portions which are in contact with a driven member, said two portions of the vibration member being juxtaposed; and
(b) an electro-mechanical energy conversion member for generating a travelling vibration wave in said vibration member in response to an applied electrical signal, said first portion vibrating in the nth-order mode and said second portion vibrating in the (n+1)th-order mode (n being integers exclusive of zero) when the conversion member generates the vibration wave in the vibration member.

11. A vibration member for a vibration wave driven printer comprising:

a vibration member having first and second portions which are in contact with a driven member and for generating a vibration wave in response to an applied electrical signal, said first portion vibrating in the nth-order mode and said second portion vibrating in the (n+1)th-order mode (n being integers exclusive of zero) when the vibration wave is generated in the vibration member.

12. A vibration wave driven printer comprising:
(a) a driven member fixed in place in the body of the printer;
(b) a loop-shaped vibration member having first and second straightly arranged projection groups which are in contact with said driven member, said first and second projection groups being juxtaposed;
(c) an electro-mechanical energy conversion member for generating a travelling vibration wave in said vibration member in response to an applied electrical signal, said first projection group vibrating in the nth-order mode and said second projection group vibrating in the (n+1)th-order mode (n being integers exclusive of zero) when the conversion member generates the vibration wave in the vibration member; and
(d) a guide member functionally engaged with said vibration member so that said vibration member may move only in a predetermined direction.

13. A vibration wave driven printer according to claim 12, wherein said vibration member is of an elliptical shape.

* * * * *